US012804113B2

(12) United States Patent
Jiang et al.

(10) Patent No.: US 12,804,113 B2
(45) Date of Patent: Nov. 17, 2026

(54) IMAGE PROCESSING METHOD AND APPARATUS, AND DEVICE, COMPUTER-READABLE STORAGE MEDIUM AND PRODUCT

(71) Applicant: Beijing Zitiao Network Technology Co., Ltd., Beijing (CN)

(72) Inventors: Linjun Jiang, Beijing (CN); Qili Deng, Beijing (CN); Jiawei Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/160,817

(22) PCT Filed: Mar. 4, 2024

(86) PCT No.: PCT/CN2024/079929
§ 371 (c)(1),
(2) Date: Aug. 28, 2025

(87) PCT Pub. No.: WO2024/183694
PCT Pub. Date: Sep. 12, 2024

(65) Prior Publication Data

US 2026/0246900 A1 Aug. 20, 2026

(30) Foreign Application Priority Data

Mar. 7, 2023 (CN) ......................... 202310232924.3

(51) Int. Cl.
*H04N 13/111* (2018.01)
*H04N 21/2187* (2011.01)
*H04N 21/2343* (2011.01)

(52) U.S. Cl.
CPC ....... *H04N 13/111* (2018.05); *H04N 21/2187* (2013.01); *H04N 21/2343* (2013.01)

(58) Field of Classification Search
CPC ............. H04N 13/111; H04N 21/2187; H04N 21/2343
(Continued)

(56) References Cited

U.S. PATENT DOCUMENTS

| | | | | |
|---|---|---|---|---|
| 2019/0158813 | A1* | 5/2019 | Rowell ................ | H04N 13/111 |
| 2021/0153629 | A1 | 5/2021 | Wu et al. | |
| 2021/0312665 | A1 | 10/2021 | Deng et al. | |

FOREIGN PATENT DOCUMENTS

| | | | |
|---|---|---|---|
| CN | 106713988 | A | 5/2017 |
| CN | 108876725 | A | 11/2018 |

(Continued)

OTHER PUBLICATIONS

International Patent Application No. PCT/CN2024/079929; Int'l Written Opinion and Search Report; dated May 30, 2024; 7 pages.

*Primary Examiner* — Nguyen T Truong
(74) *Attorney, Agent, or Firm* — BakerHostetler

(57) ABSTRACT

Provided in the embodiments of the present disclosure are an image processing method and apparatus, and a device, a computer-readable storage medium and a product. The method comprises: acquiring at least one target object area image in a target image frame corresponding to a virtual-reality live broadcast; performing a distortion correction operation on the at least one target object area image, so as to obtain at least one distortion-free image; performing an image processing operation on the basis of the at least one distortion-free image, so as to obtain at least one processed image; performing an inverse transformation operation of the distortion correction operation on the at least one processed image, so as to obtain at least one inversely transformed image; and replacing the at least one target object area image in the target image frame with the at least one inversely transformed image, so as to obtain a target image frame.

20 Claims, 5 Drawing Sheets

(58) Field of Classification Search
USPC ........................................................... 348/42
See application file for complete search history.

(56) References Cited

FOREIGN PATENT DOCUMENTS

| | | | |
|---|---|---|---|
| CN | 109035180 | A | 12/2018 |
| CN | 113610018 | A | 11/2021 |
| CN | 114581293 | A | 6/2022 |
| CN | 115423827 | A | 12/2022 |
| CN | 115442637 | A | 12/2022 |
| KR | 2021-0091070 | A | 7/2021 |

* cited by examiner

IMAGE PROCESSING METHOD AND APPARATUS, AND DEVICE, COMPUTER-READABLE STORAGE MEDIUM AND PRODUCT

CROSS-REFERENCE TO RELATED APPLICATIONS

The present application is a national phase application of the International Application No. PCT/CN2024/079929, filed on Mar. 4, 2024, which is based on and claims priority to Chinese Application No. 202310232924.3 filed on Mar. 7, 2023, the disclosures of both applications are incorporated herein by reference in their entireties.

TECHNICAL FIELD

Embodiments of the present disclosure relate to the technical field of virtual reality, and in particular an image processing method and apparatus, a device, a computer-readable storage medium, and a product.

BACKGROUND

With the continuous progress of virtual reality technologies, virtual reality live streaming has gradually entered users' lives. When users perform virtual reality live streaming, there is often a need to beautify the live content. For example, users can trigger beautification requests such as beauty and beauty makeup according to actual needs.

In practical applications, binocular virtual reality cameras are generally used to acquire live streaming contents in virtual reality live streaming. However, because a target object in images shot by the binocular virtual reality camera will have serious distortion, it is very different from the target object in the images shot by an ordinary camera. Therefore, if a beautification operation is directly performed on the target object based on the images shot by the binocular virtual reality camera, the beautification effect often cannot meet the actual needs of users, resulting in poor user experience.

SUMMARY

Embodiments of the present disclosure provide an image processing method and apparatus, a device, a computer-readable storage medium, and a product for the solution of the existing technical problem of a poor target object processing effect in a virtual reality live streaming process.

According to a first aspect, an embodiment of the present disclosure provides an image processing method, comprising:

- acquiring at least one target object area image in a target image frame corresponding to a virtual reality live streaming in response to a target object processing request triggered by a user in the virtual reality live streaming process;
- performing a distortion correction operation on the at least one target object area image to obtain at least one distortion-free image;
- performing an image processing operation based on the at least one distortion-free image to obtain at least one processed image;
- performing an inverse transformation operation of the distortion correction operation on the at least one processed image to obtain at least one inversely transformed image;
- replacing the at least one target object area image in the target image frame with the at least one inversely transformed image to obtain a processed target image frame.

According to a second aspect, an embodiment of the present disclosure provides an image processing apparatus, comprising:

- an acquisition module for acquiring at least one target object area image in a target image frame corresponding to a virtual reality live streaming in response to a target object processing request triggered by a user in the virtual reality live streaming process;
- a correction module for performing a distortion correction operation on the at least one target object area image to obtain at least one distortion-free image;
- a processing module for performing an image processing operation based on the at least one distortion-free image to obtain at least one processed image;
- an inverse transformation module for performing an inverse transformation operation of the distortion correction operation on the at least one processed image to obtain at least one inversely transformed image;
- a replacement module for replacing the at least one target object area image in the target image frame with the at least one inversely transformed image to obtain a processed target image frame.

According to a third aspect, an embodiment of the present disclosure provides an electronic device, comprising: a processor and a memory;

- wherein the memory stores computer-executed instructions;
- the processor executes the computer-executed instructions stored in the memory, so that the at least one processor executes the image processing method according to the above first aspect and various possible designs of the first aspect.

According to a fourth aspect, an embodiment of the present disclosure provides a computer-readable storage medium, wherein the computer-readable storage medium stores therein computer-executed instructions, which when being executed by a processor, implements the image processing method according to the above first aspect and various possible designs of the first aspect.

According to a fifth aspect, an embodiment of the present disclosure provides a computer program product comprising a computer program, wherein the computer program, when executed by a processor, implements the image processing method according to the above first aspect and various possible designs of the first aspect.

The image processing method and apparatus, the device, the computer-readable storage medium, and the product provided by the present embodiment comprises: after acquiring a target object processing request triggered by a user in a virtual reality live streaming process, acquiring at least one target object area image in a target image frame corresponding to the virtual reality live streaming, and performing a distortion correction operation on the target object area image to obtain a distortion-free image.

BRIEF DESCRIPTION OF THE DRAWINGS

In order to more clearly explain the technical solutions in the embodiments of the present disclosure or related technologies, the drawings needed to be used in the description of the embodiments or related technologies will be briefly introduced below. Obviously, the drawings in the following description are some embodiments of the present disclosure, and other drawings can be obtained based on these drawings by those skilled in the art without inventive effort.

DETAILED DESCRIPTION

Figure 1:
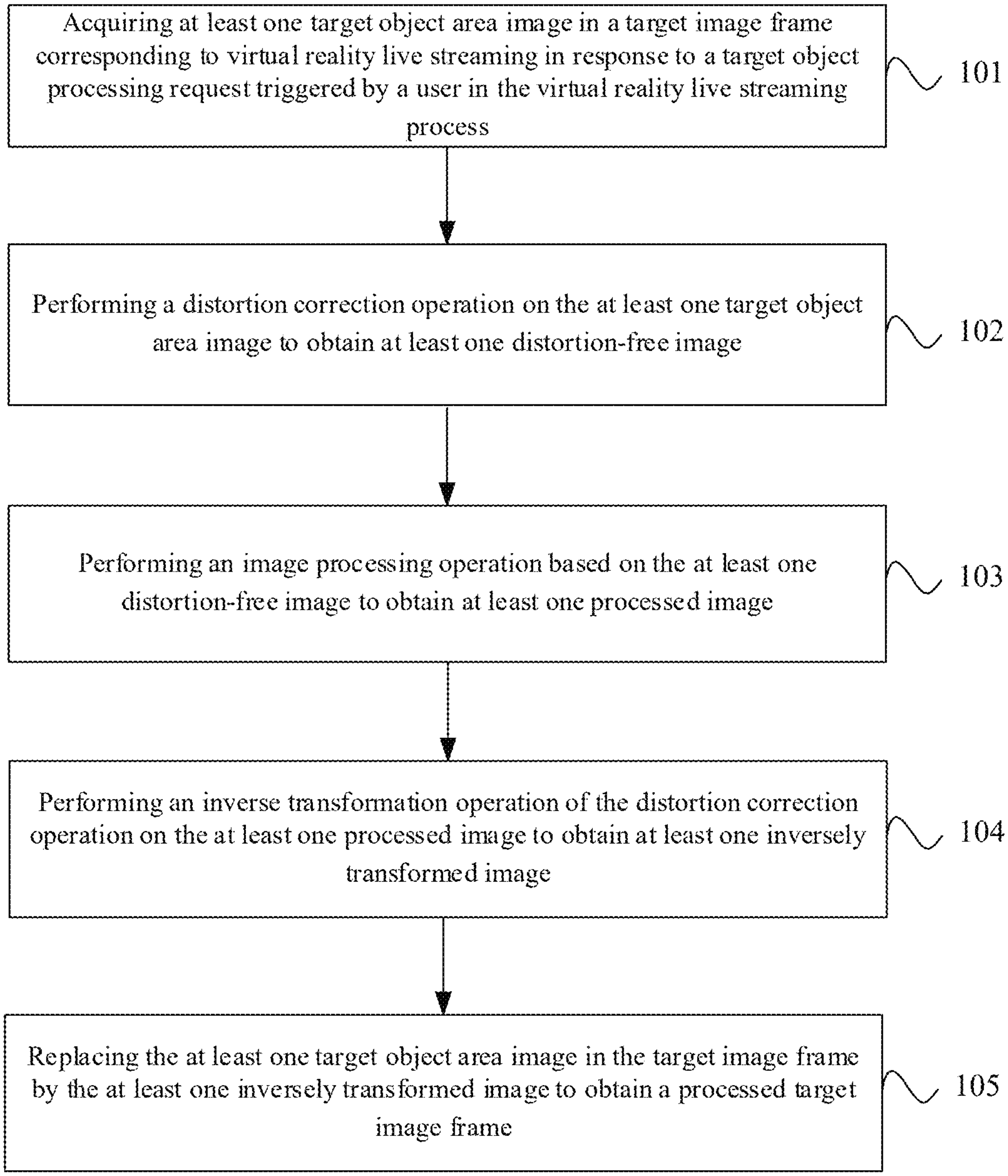
FIG. 1 is a schematic flow diagram of an image processing method provided by an embodiment of the present disclosure.

In order to make the objects, technical solutions and advantages of embodiments of the present disclosure more clear, the technical solutions in the embodiments of the present disclosure will be described clearly and completely in combination with the attached drawings in the embodiments of the present disclosure. Obviously, the described embodiments are a part of the embodiments of the present disclosure, but not all the embodiments. Based on the embodiments in the present disclosure, all other embodiments obtained by those skilled in the art without inventive effort belong to the protection scope of the present disclosure.

In order to solve the existing technical problem of a poor target object processing effect in the virtual reality live streaming process, the present disclosure provides an image processing method and apparatus, a device, a computer-readable storage medium, and a product.

It should be noted that the image processing method and apparatus, the device, the computer-readable storage medium, and the product provided by the present disclosure can be applied to any virtual reality image processing scene.

The current virtual reality live streaming generally adopts a binocular virtual reality camera to realize the acquisition of virtual reality live streaming contents. However, the live streaming image frames acquired by the binocular virtual reality camera often have a high resolution. For example, the live streaming image frame acquired by the binocular virtual reality camera can be an image with a 8K resolution (3840*7680). Therefore, an image beautification operation based on this large-resolution live streaming image frame often requires a large amount of calculation, which cannot ensure the real-time performance of image beautification. In addition, due to the presence of the serious distortion in the target object part in the live streaming image frame acquired by the binocular virtual reality camera, performing an image processing operation for the target object directly based on the live streaming image frame acquired by the binocular virtual reality camera will affect the accuracy of detecting the target object key point and cannot ensure the beautification effect of the target object.

In the process of solving the above technical problems, the inventor found through research that in order to ensure the beautification effect of the target object of the target image frame in the virtual reality live streaming, after acquiring the target image frame in the virtual reality live streaming, it is possible to perform a distortion correction operation on the target object part in the live streaming image frame to obtain a distortion-free target object area image. Then, an image processing operation for the target object is performed based on the distortion-free target object area image. An inverse transformation operation of the distortion correction operation is performed on the beautified target object area image, and the target object part in the target image frame is replaced with the target object area image after the inverse transformation operation, so as to achieve a good target object beautification effect.

Furthermore, by performing the distortion correction operation only on the target object part and performing the image processing operation for the target object based on the distortion-free target object area image, the amount of calculation in the target object beautification process can be effectively reduced, the pressure of the video memory and the memory can be reduced, and the real-time performance of beautifying the target object can be ensured.

The system architecture on which the present embodiment is based at least includes a terminal device, a virtual reality device and a server. The server is communicatively connected with the terminal device and the virtual reality device respectively. Therefore, the server can acquire the target image frame acquired by the virtual reality device based on the target object processing request triggered by the user on the terminal device. The distortion correction operation is performed on the target object part in the target image frame to obtain the distortion-free target object area image. Then, the target object processing operation is performed based on the distortion-free target object area image.

FIG. 1 is a schematic flow diagram of an image processing method provided by an embodiment of the present disclosure. As shown in FIG. 1, the method includes:

Step 101: acquiring at least one target object area image in a target image frame corresponding to a virtual reality live streaming in response to a target object processing request triggered by a user in the virtual reality live streaming process.

The execution subject of the present embodiment is an image processing apparatus. The image processing apparatus can be coupled to the server, and the server can be communicatively connected with the terminal device and the virtual reality device, respectively, so that based on the target object processing request triggered by the user on the terminal device, the target image frame acquired by the virtual reality device can be acquired to perform the image processing operation. Alternatively, the image processing apparatus can also be coupled to the terminal device or the virtual reality device. Therefore, the target image frame acquired by the virtual reality device can be obtained to perform the image processing operation based on the target object processing request triggered by the user on the terminal device.

In the present implementation, when the user performs the virtual reality live streaming, if it is necessary to perform a live streaming image processing operation, a target object processing request can be initiated. For example, if the target object processing request is a beauty request triggered by a user, wherein the target object processing request of the live streaming image includes but is not limited to beautification operations such as facial beautification, effect processing, and filter adding.

Accordingly, the image processing apparatus can acquire the target image frame corresponding to the virtual reality live streaming in response to a target object processing request triggered by a user in the virtual reality live streaming process.

Further, the target object processing request can be a beautification request for a certain preset target object. Continuing from the above example, if the target object processing request can be a beauty request, a beauty makeup request, etc., the target object can be the user's face area. Alternatively, if the target object processing request can be an effect rendering request, the target object can be an object on which the effect is applied. For example, if the effect is to wear virtual glasses on the face, the target object can be the user's eye area.

Therefore, in order to accurately realize the image processing operation for the target object, the target object region image in the target image frame can be acquired, wherein the number of the target object area images can be at least one.

For example, if the target image frame is an image acquired by the binocular virtual reality camera, the target image frame can be formed by splicing two images acquired by the left and right cameras, respectively. The target object area images in the two images can be extracted respectively to obtain at least one target object area image.

It should be noted that the human face image is acquired after the user's full authorization is obtained.

Step 102: performing a distortion correction operation on the at least one target object area image to obtain at least one distortion-free image.

In the present implementation, when the virtual reality live streaming contents are acquired by the binocular virtual reality camera, the images acquired by the binocular virtual reality camera often have serious distortion. Therefore, if the image processing is directly performed on the target object in the acquired target image frame, it will result in a poor image processing effect and poor user experience.

Therefore, in order to ensure the target object processing effect of the virtual reality live streaming content, after acquiring at least one target object area image, it is possible to perform a distortion correction operation on the at least one target object area image to obtain at least one distortion-free image.

Step 103: performing an image processing operation based on the at least one distortion-free image to obtain at least one processed image.

In the present implementation, after acquiring at least one distortion-free image, it is possible to perform an image processing operation based on the at least one distortion-free image to obtain at least one processed image. Because there is no distortion in the distortion-free image, a good image processing effect can be obtained by performing the image processing operation based on the distortion-free image.

In addition, after the distortion correction operation is performed on the target object area image, the resolution of the obtained distortion-free image is much smaller than that of the target image frame. Therefore, performing the image processing operation based on the distortion-free image can effectively reduce the amount of calculation in the image processing process, so as to ensure the real-time performance of image processing in the virtual live streaming process and further improve the user experience.

Step 104: performing an inverse transformation operation of the distortion correction operation on the at least one processed image to obtain at least one inversely transformed image.

In the present implementation, in order to ensure the viewing effect of the virtual reality live streaming, it is also possible to adjust at least one processed image to the image format as acquired by the binocular virtual reality camera. Therefore, it is possible to perform an inverse transformation operation of the distortion correction operation on the at least one processed image to obtain at least one inversely transformed image.

Step 105: replacing the at least one target object area image in the target image frame with the at least one inversely transformed image to obtain a processed target image frame.

In the present implementation, it is possible to replace the at least one target object area image in the target image frame with the at least one inversely transformed image to obtain a processed target image frame.

Taking a practical application as an example, the target object processing request can specifically be a beauty request triggered by the user in the live streaming process. After acquiring the target image frame, it is possible to acquire at least one human face area image in the target image frame, and perform a distortion correction operation on the at least one human face area image to obtain a distortion-free image, so as subsequently perform a beauty operation on the distortion-free image to obtain a better beautification effect.

The image processing method provided by the present embodiment comprises acquiring at least one target object area image in a target image frame corresponding to a virtual reality live streaming after acquiring a target object processing request triggered by a user in the virtual reality live streaming process, and performing a distortion correction operation on the target object area image to obtain a distortion-free image, so as to subsequently perform a target object processing operation for the distortion-free image to obtain a better processing effect. Further, it is possible to perform an inverse transformation operation of the distortion correction operation on the processed image, and replace the target object area image in the target image frame based on the inversely transformed image after the inverse transformation to obtain a processed target image frame. The target object processing effect can be effectively improved. In addition, the distortion-free image is obtained by performing the distortion correction operation only for the target object area image, and the size of the distortion-free image is much smaller than that of the target image frame. Performing the target object image processing based on the distortion-free image effectively reduces the amount of calculation in the target object processing process, reduces the rendering pressure and improves the target object processing effect.

Further, on the basis of any of the above embodiments, step 101 includes:

acquiring a live video stream corresponding to the virtual reality live streaming in response to the target object processing request triggered by the user in the virtual reality live streaming process.

for each target image frame in the live streaming video stream, performing a target object recognition operation on the target image frame to determine position information of at least one target object in the target image frame;

acquiring the at least one target object area image according to the position information of the at least one target object.

In the present embodiment, if the user needs to perform an image processing operation of the live image when performing the virtual reality live streaming, a target object processing request can be initiated. For example, the user can trigger a target object processing request on a terminal device.

Accordingly, after acquiring the target object processing request, it is possible to acquire the live video stream corresponding to the virtual reality live streaming. The live video stream can include a plurality of target image frames. For each target image frame in the live video stream, the target object recognition operation is performed on the target image frame, and the position information of at least one target object in the target image frame is determined. At least one target object area image is obtained according to the position information of at least one target object.

For example, if the target object is a human face, it is possible to perform a recognition operation on the human face in the target image frame by a preset human face recognition model to obtain at least one human face frame corresponding to the human face. An image in the at least one human face frame area is taken out as at least one target object area image.

Further, on the basis of any of the above embodiments, the performing a target object recognition operation on the target image frame to determine position information of at least one target object in the target image frame includes:

performing a scaling operation on the target image frame according to a preset scale size to obtain a scaled target image frame;

performing a target object recognition operation on the scaled target image frame to determine the position information of the at least one target object in the scaled target image frame.

In the present embodiment, when the target object recognition operation is performed, the resolution of the image processed by the recognition algorithm may be different from that of the live streaming image frame, so the scaling operation needs to be performed on the target object before the target object recognition is performed on the target image frame.

Optionally, it is possible to perform a scaling operation on the target image frame according to a preset scale size to obtain a scaled target image frame. The preset scale size can be a scale size corresponding to the currently used recognition algorithm. The target object recognition operation is performed on the scaled target image frame, and the position information of at least one target object in the scaled target image frame is determined.

According to the image processing method provided by the present embodiment, by performing a scaling operation on the target image frame for each target image frame in the live video stream after acquiring the live video stream corresponding to the virtual reality live streaming, and performing the target object recognition operation based on the scaled target image frame, the amount of calculation in the image processing process can be further reduced, and the real-time performance of image processing in the live streaming process can be ensured.

Figure 2:
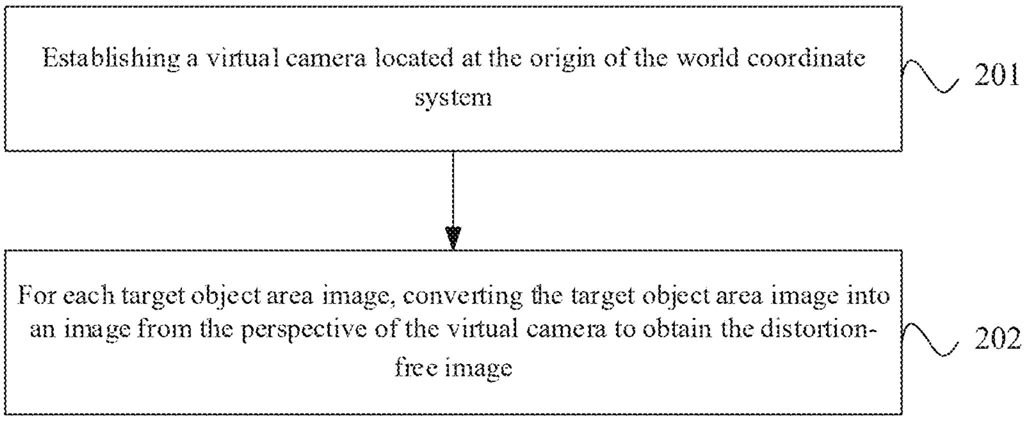
FIG. 2 is a schematic flow diagram of an image processing method provided by another embodiment of the present disclosure.

FIG. 2 is a schematic flow diagram of an image processing method provided by another embodiment of the present disclosure. On the basis of any of the above embodiments, as shown in FIG. 2, step 102 includes:

Step 201: establishing a virtual camera located at an origin of a world coordinate system.

Step 202: for each target object area image, converting the target object area image into an image from the perspective of the virtual camera to obtain the distortion-free image.

In the present embodiment, the target image frame corresponding to the virtual reality live streaming is an image frame with distortion, while the picture viewed by the user through the virtual reality device is normal and distortion-free. The target image frame corresponding to the virtual reality live streaming can be displayed in the virtual reality device in the form of a hemisphere map. Therefore, it is possible to establish a virtual camera located at the origin of the world coordinate system, and simulate the picture viewed by the user through the virtual reality device based on the virtual camera.

Therefore, after establishing the virtual camera located at the origin of the world coordinate system, for each target object area image, it is possible to convert the target object area image into an image from the perspective of the virtual camera to obtain the distortion-free image.

Figure 3:
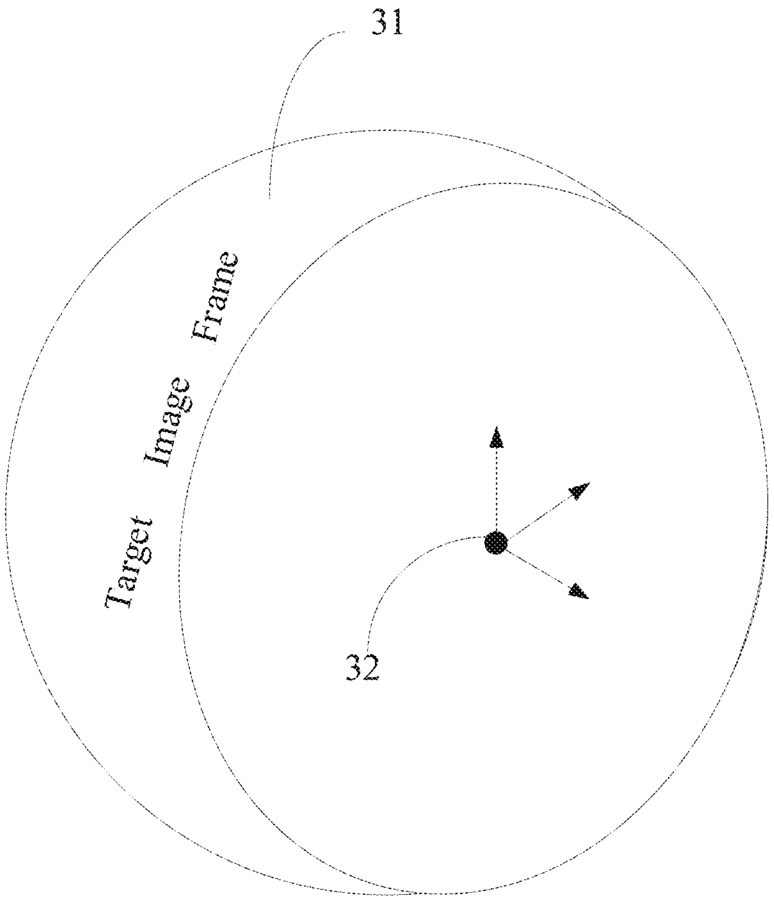
FIG. 3 is a schematic diagram of a virtual camera provided by an embodiment of the present disclosure.

FIG. 3 is a schematic diagram of a virtual camera provided by an embodiment of the present disclosure. As shown in FIG. 3, a target image frame 31 can be presented to the viewers in the form of a hemispherical map. It is possible to establish a virtual camera 32 located at the origin of the world coordinate system, and convert the target object area image into an image from the perspective of the virtual camera, that is, an distortion-free image.

Further, on the basis of any of the above embodiments, step 202 includes:

for each first pixel point in each target object area image from the perspective of the virtual camera, performing a matrix projection operation on the first pixel point according to an observation matrix and a projection matrix corresponding to the virtual camera to obtain a first three-dimensional space coordinate;

determining first latitude and longitude information of each first pixel point in a spherical coordinate system where the target object area image is located according to the first three-dimensional space coordinate corresponding to the each first pixel point;

determining a first texture mapping coordinate corresponding to the first latitude and longitude information according to a mapping relationship between the latitude and longitude and a texture mapping coordinate system corresponding to the target object area image;

performing a combination operation on the first texture mapping coordinate corresponding to each first pixel point to obtain the distortion-free image.

In the present embodiment, after establishing the virtual camera, it is also possible to determine the observation matrix and projection matrix corresponding to the virtual camera, respectively. Assuming that the picture from the perspective of the virtual camera is $F_i$, for each first pixel point in each target object area image from the perspective of the virtual camera, it is possible to perform a matrix projection operation on the first pixel point according to the observation matrix and the projection matrix corresponding to the virtual camera to obtain a first three-dimensional space coordinate. After obtaining the first three-dimensional space coordinate, it is also possible to inversely determine first latitude and longitude information of each first pixel point in a spherical coordinate system where the target object area image is located according to the first three-dimensional space coordinate.

Further, it is possible to determine a mapping relationship between the latitude and longitude and a texture mapping coordinate system corresponding to the target object area image. The mapping relationship can be shown in Formulas 1-2:

$$\text{Latitude} \in [0,\pi] \rightarrow u \in [0,1] \quad (1)$$

$$\text{Longtitude} \in [0,\pi] \rightarrow v \in [0,1] \quad (2)$$

Based on the mapping relationship, the first texture mapping coordinate corresponding to the first latitude and longitude information can be determined. Each first texture mapping coordinate is assigned to the corresponding pixel point in $F_i$. A combination operation is performed according to the first texture mapping coordinate corresponding to each pixel to generate the distortion-free image.

According to the image processing method provided by the present embodiment, by establishing a virtual camera located at the origin of the world coordinate system and converting the target object area image into an image from the perspective of the virtual camera, the distortion correction operation on the target object area image can be effectively realized, and the accuracy of image processing can be ensured.

Figure 4:
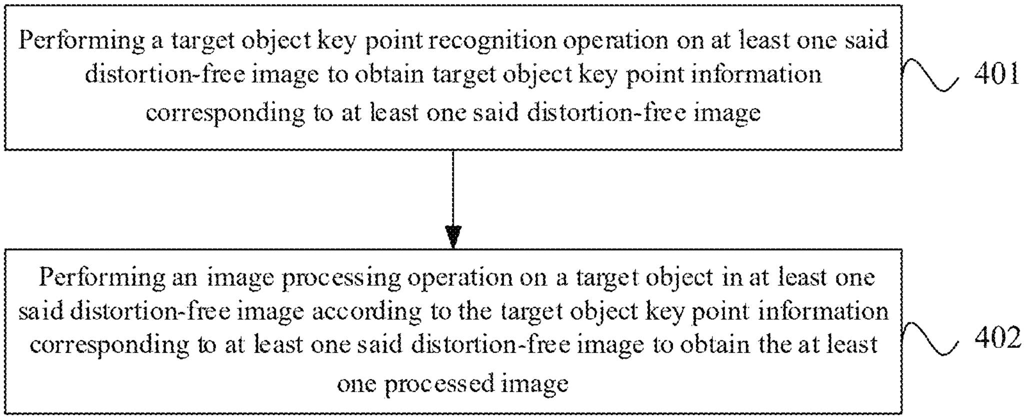
FIG. 4 is a schematic flow diagram of an image processing method provided by another embodiment of the present disclosure.

FIG. 4 is a schematic flow diagram of an image processing method provided by another embodiment of the present disclosure. On the basis of any of the above embodiments, as shown in FIG. 4, step 103 includes:

Step 401: performing a target object key point recognition operation on the at least one distortion-free image to obtain target object key point information corresponding to the at least one distortion-free image.

Step 402: performing an image processing operation on a target object in the at least one distortion-free image according to the target object key point information corresponding to the at least one distortion-free image to obtain the at least one processed image.

In the present embodiment, after the distortion-free image is obtained, because there is no distortion in the distortion-free image, the target object recognition operation is performed based on the distortion-free image, and a more accurate recognition result can be obtained.

Optionally, it is possible to perform a target object key point recognition operation on at least one distortion-free image to obtain target object key point information corresponding to the at least one distortion-free image. Further, it is possible to perform an image processing operation on a target object in the at least one distortion-free image based on the target object key point information corresponding to the at least one distortion-free image to obtain at least one processed image.

For example, if the target object processing request is to render an effect of glasses on the human face, the key point information of the eyes can be recognized in the distortion-free image. According to the key point information, a rendering operation of the effect of glasses is performed on the eyes.

Still, for example, if the target object processing request is a beauty request, key point information of the user's facial features can be recognized in the distortion-free image. Then a beauty operation can be performed according to the key point information of the facial features.

According to the image processing method provided by the present embodiment, by performing the target object key point recognition operation on the distortion-free image again after acquiring the distortion-free image, a target object key point in the distortion-free image can be accurately determined, and then the image processing can be accurately performed based on the target object key point, thus improving the accuracy of image processing.

Figure 5:
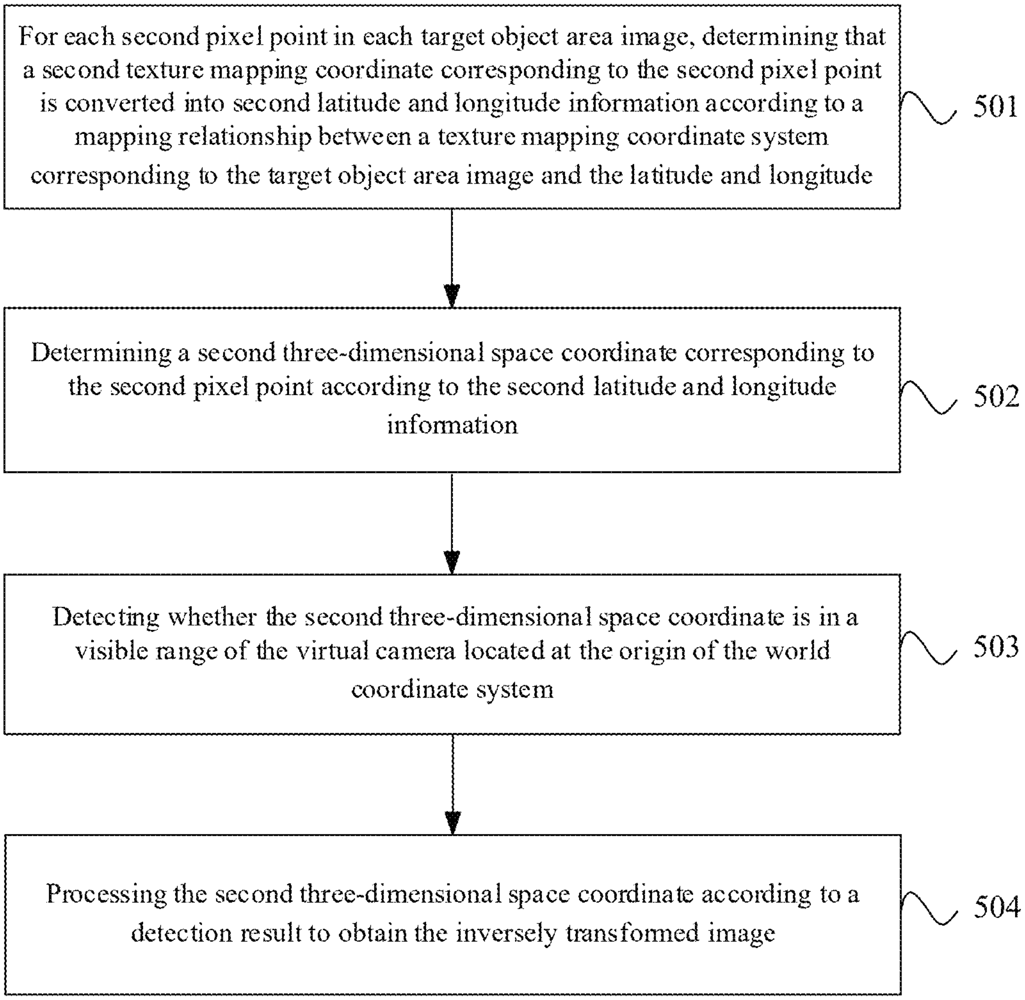
FIG. 5 is a schematic flow diagram of an image processing method provided by another embodiment of the present disclosure.

FIG. 5 is a schematic flow diagram of an image processing method provided by another embodiment of the present disclosure. On the basis of any of the above embodiments, as shown in FIG. 5, step 104 includes:

Step 501: for each second pixel point in each target object area image, determining that a second texture mapping coordinate corresponding to the second pixel point is converted into second latitude and longitude information according to a mapping relationship between a texture mapping coordinate system corresponding to the target object area image and the latitude and longitude;

Step 502: determining a second three-dimensional space coordinate corresponding to the second pixel point according to the second latitude and longitude information;

Step 503: detecting whether the second three-dimensional space coordinate is in a visible range of the virtual camera located at the origin of the world coordinate system;

Step 504: processing the second three-dimensional space coordinate according to a detection result to obtain the inversely transformed image.

In the present embodiment, since the live streaming image frame viewed in the virtual reality device is normal and distortion-free, if the distortion-free image after image processing is directly sent to the virtual reality device for presentation, the user may see the presence of the distorted image in the virtual reality device. Therefore, it is also necessary to perform an inverse transformation operation of the distortion correction operation on the processed image.

Optionally, for each second pixel point in each target object area image, it is determined that the second texture mapping coordinate corresponding to the second pixel point is converted into the second latitude and longitude information according to the mapping relationship between the texture mapping coordinate system corresponding to the target object area image and the latitude and longitude. The second three-dimensional space coordinate corresponding to the second pixel point is determined according to the second latitude and longitude information.

Further, part of the pixel points in the target object area image falls in the visible range of the virtual camera located at the origin of the world coordinate system and part of the pixel points falls outside the visible range of the virtual camera. Therefore, after determining the second three-dimensional space coordinate corresponding to the second pixel point, it is also necessary to detect whether the second three-dimensional space coordinate is in the visible range of the virtual camera located at the origin of the world coordinate system. According to the detection result, the second three-dimensional space coordinate is processed in a manner matching with the detection result to obtain an inversely transformed image.

Further, on the basis of any of the above embodiments, step 504 includes:

if the second three-dimensional space coordinate is in the visible range of the virtual camera, performing a matrix projection operation on the second three-dimensional space coordinate according to an observation matrix and a projection matrix corresponding to an image acquisition apparatus that acquires the target object area image to obtain a third pixel point of the second three-dimensional space coordinate from the perspective of the image acquisition apparatus, and replacing the corresponding second pixel point with the third pixel point;

if the second three-dimensional space coordinate is not in the visible range of the virtual camera, not processing the second pixel point corresponding to the second three-dimensional space coordinate;

generating the inversely transformed image according to the third pixel point located in the visible range of the virtual camera and the second pixel point not in the visible range of the virtual camera.

In the present embodiment, if the second three-dimensional space coordinate is in the visible range of the virtual camera, it needs to be converted into a pixel point from the perspective of the image acquisition apparatus. Therefore, it is possible to perform a matrix projection operation on the second three-dimensional space coordinate according to an observation matrix and a projection matrix corresponding to an image acquisition apparatus that acquires the target object area image to obtain a third pixel point of the second three-dimensional space coordinate from the perspective of the image acquisition apparatus, and replacing the corresponding second pixel point with the third pixel point.

On the contrary, if the second three-dimensional space coordinate is not in the visible range of the virtual camera, it is possible to not process the second pixel point corresponding to the second three-dimensional space coordinate. Therefore, it is possible to subsequently generate the inversely transformed image according to the third pixel point located in the visible range of the virtual camera and the second pixel point not in the visible range of the virtual camera, which thus ensures the user's viewing experience.

In the image processing method provided by the present embodiment, in the virtual reality live streaming process, the live streaming content can be presented to the viewers in the form of a hemispherical map. Therefore, after obtaining the distortion-free image, in order to ensure the user's viewing experience of the virtual reality live streaming, the distortion-free image can also be converted into an inversely transformed image in the form of a hemispherical map. Therefore, on the basis of ensuring the real-time performance of image processing in the virtual reality live streaming process, the live streaming effect of the virtual reality live streaming can also be ensured.

Figure 6:
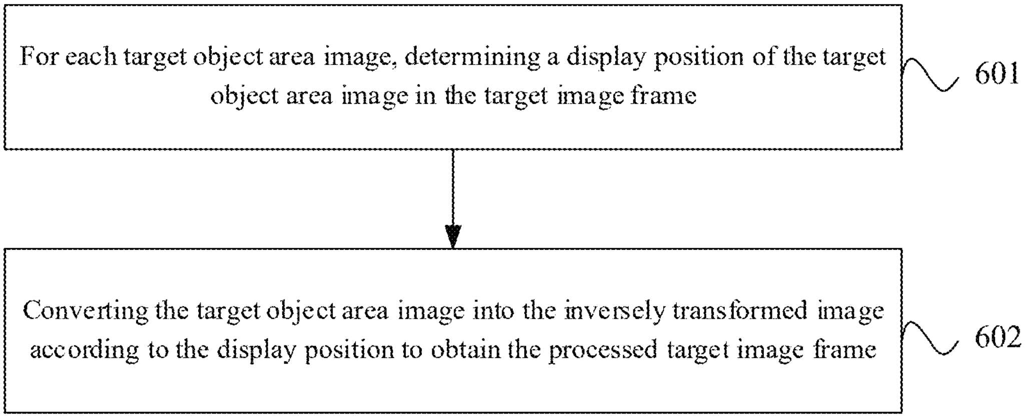
FIG. 6 is a schematic flow diagram of an image processing method provided by another embodiment of the present disclosure.

FIG. 6 is a schematic flow diagram of an image processing method provided by another embodiment of the present disclosure. On the basis of any of the above embodiments, as shown in FIG. 6, step 105 includes:

Step 601: for each target object area image, determining a display position of the target object area image in the target image frame;

Step 602: converting the target object area image into the inversely transformed image according to the display position to obtain the processed target image frame.

In the present embodiment, in order to realize the replacement operation on the target object area image in the live streaming image frame, the display position of each target object area image in the target image frame can be determined first. The display position can be obtained in the target object recognition process. Therefore, after acquiring the display position, it is possible to inversely transform the target object area image according to the display position to obtain the processed target image frame.

According to the image processing method provided by the present embodiment, by determining the display position of the target object area image in the target image frame, the replacement operation of the inversely transformed image can be accurately realized based on the display position, and the live streaming effect of the virtual reality live streaming can be also ensured on the basis of ensuring the real-time performance of image processing in the virtual reality live streaming process.

Figure 7:
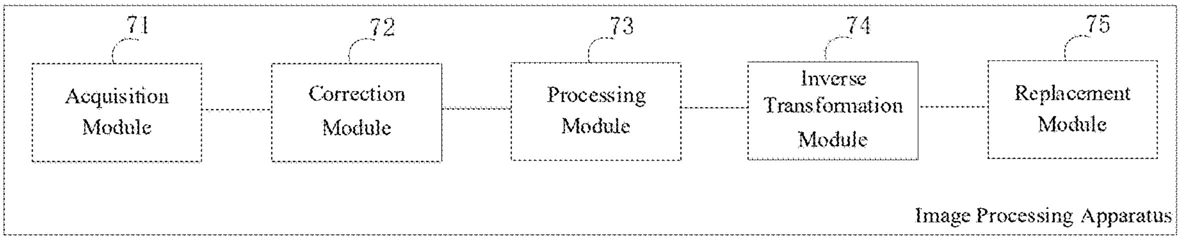
FIG. 7 is a schematic structural diagram of an image processing apparatus provided by an embodiment of the present disclosure.

FIG. 7 is a schematic structural diagram of an image processing apparatus provided by an embodiment of the present disclosure. As shown in FIG. 7, the apparatus includes: an acquisition module 71, a correction module 72, a processing module 73, an inverse transformation module 74 and a replacement module 75. The acquisition module 71 is used for acquiring at least one target object area image in a target image frame corresponding to a virtual reality live streaming in response to a target object processing request triggered by a user in the virtual reality live streaming process. The correction module 72 is used for performing a distortion correction operation on the at least one target object area image to obtain at least one distortion-free image. The processing module 73 is used for performing an image processing operation based on the at least one distortion-free image to obtain at least one processed image. The inverse transform module 74 is used for performing an inverse transformation operation of the distortion correction operation on the at least one processed image to obtain at least one inversely transformed image. The replacement module 75 is used for replacing the at least one target object area image in the target image frame with the at least one inversely transformed image to obtain a processed target image frame.

Further, on the basis of any of the above embodiments, the acquisition module is used for: acquiring a live video stream corresponding to the virtual reality live streaming in response to the target object processing request triggered by the user in the virtual reality live streaming process; for each target image frame in the live video stream, performing a target object recognition operation on the target image frame to determine position information of at least one target object in the target image frame; acquiring the at least one target object area image according to the position information of the at least one target object.

Further, on the basis of any of the above embodiments, the acquisition module is used for: performing a scaling operation on the target image frame according to a preset scale size to obtain a scaled target image frame; performing a target object recognition operation on the scaled target image frame to determine the position information of the at least one target object in the scaled target image frame.

Further, on the basis of any of the above embodiments, the correction module is used for: establishing a virtual camera located at the origin of the world coordinate system; for each target object area image, converting the target object area image into an image from the perspective of the virtual camera to obtain the distortion-free image.

Further, on the basis of any of the above embodiments, the correction module is used for: for each first pixel point in each target object area image from the perspective of the virtual camera, performing a matrix projection operation on the first pixel point according to an observation matrix and a projection matrix corresponding to the virtual camera to obtain a first three-dimensional space coordinate; determining first latitude and longitude information of each first pixel point in a spherical coordinate system where the target object area image is located according to the first three-dimensional space coordinate corresponding to each first pixel point; determining a first texture mapping coordinate corresponding to the first latitude and longitude information according to a mapping relationship between the latitude and longitude and a texture mapping coordinate system corresponding to the target object area image; performing a combination operation on the first texture mapping coordinate corresponding to each first pixel point to obtain the distortion-free image.

Further, on the basis of any of the above embodiments, the processing module is used for: performing a target object key point recognition operation on the at least one distortion-free image to obtain target object key point information corresponding to the at least one distortion-free image; performing an image processing operation on a target object in the at least one distortion-free image according to the target object key point information corresponding to the at least one distortion-free image to obtain the at least one processed image.

Further, on the basis of any of the above embodiments, the inverse transformation module is used for: for each second pixel point in each target object area image, determining that a second texture mapping coordinate corresponding to the second pixel point is converted into second latitude and longitude information according to a mapping relationship between a texture mapping coordinate system corresponding to the target object area image and the latitude and longitude; determining a second three-dimensional space coordinate corresponding to the second pixel point according to the second latitude and longitude information; detecting whether the second three-dimensional space coordinate is in a visible range of the virtual camera located at the origin of the world coordinate system; processing the second three-dimensional space coordinate according to a detection result to obtain the inversely transformed image.

Further, on the basis of any of the above embodiments, the inverse transformation module is used for: if the second three-dimensional space coordinate is in the visible range of the virtual camera, performing a matrix projection operation on the second three-dimensional space coordinate according to an observation matrix and a projection matrix corresponding to an image acquisition apparatus that acquires the target object area image to obtain a third pixel point of the second three-dimensional space coordinate from the perspective of the image acquisition apparatus, and replacing the corresponding second pixel point with the third pixel point; if the second three-dimensional space coordinate is not in the visible range of the virtual camera, not processing the second pixel point corresponding to the second three-dimensional space coordinate; generating the inversely transformed image according to the third pixel point located in the visible range of the virtual camera and the second pixel point not in the visible range of the virtual camera.

Further, on the basis of any of the above embodiments, the replacement module is used for: for each target object area image, determining a display position of the target object area image in the target image frame; replacing the target object area image with the inversely transformed image according to the display position to obtain the processed target image frame.

The device provided by the present embodiment can be used to execute the technical solution of the above method embodiment, and its implementation principle and technical effect are similar, so the details of the present embodiment are not repeated here.

In order to realize the above embodiment, an embodiment of the present disclosure also provides an electronic device, including: a processor and a memory;

wherein the memory stores computer-executed instructions;

the processor executes the computer-executed instructions stored in the memory, so that the processor executes the image processing method according to any of the above embodiments.

Figure 8:
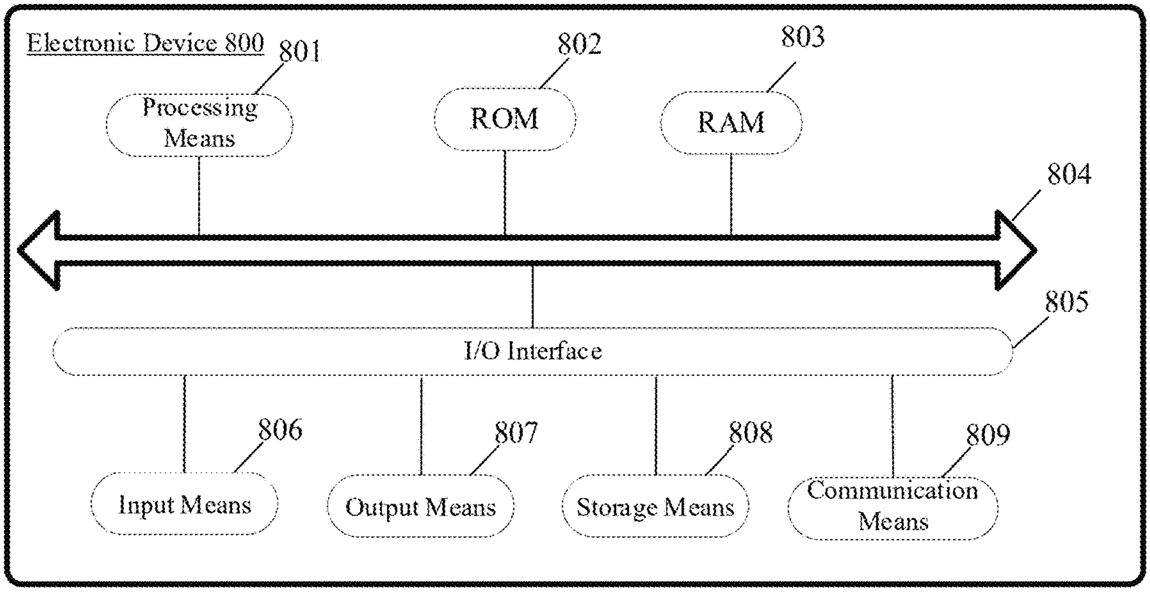
FIG. 8 is a schematic structural diagram of an electronic device provided by an embodiment of the present disclosure.

FIG. 8 is a schematic structural diagram of an electronic device provided by an embodiment of the present disclosure. As shown in FIG. 8, the electronic device 800 can be a terminal device or a server. The terminal device can include, but is not limited to, mobile terminals such as a mobile phone, a notebook computer, a digital broadcast receiver, a Personal Digital Assistant (PDA), a Portable Android Device (PAD), a portable multimedia player (PMP), and a vehicle-mounted terminal (such as a vehicle-mounted navigation terminal), as well as fixed terminals such as a digital TV and a desktop computer. The electronic device shown in FIG. 8 is only an example, and should not bring any limitation to the functions and application scope of the embodiments of the present disclosure.

As shown in FIG. 8, an electronic device 800 can include a processing means (such as a central processor, a graphics processor) 801, which can perform various appropriate actions and processes according to a program stored in a Read Only Memory (ROM) 802 or a program loaded from a storage means 808 into a Random Access Memory (RAM) 803. In the RAM 803, various programs and data required for the operation of the electronic device 800 are also stored. The processing means 801, the ROM 802 and the RAM 803 are connected to each other through a bus 804. An input/output (I/O) interface 805 is also connected to the bus 804.

Generally, the following means can be connected to the I/O interface 805: an input means 806 including, for example, a touch screen, a touch pad, a keyboard, a mouse, a camera, a microphone, an accelerometer, and a gyroscope; an output means 807 including, for example, a Liquid Crystal Display (LCD), a speaker, and a vibrator; a storage means 808 such as a magnetic tape, and a hard disk; and a communication means 809. The communication means 809 can allow the electronic device 800 to communicate wirelessly or wired with other devices to exchange data. Although FIG. 8 shows an electronic device 800 with various devices, it should be understood that it is not required to implement or provide all the means shown. More or fewer means can alternatively be implemented or provided.

In particular, according to the embodiment of the present disclosure, the process described above with reference to the flow diagram can be implemented as a computer software program. For example, an embodiment of the present disclosure includes a computer program product, which includes a computer program carried on a computer-readable medium, and the computer program contains program codes for executing the method shown in the flow diagram. In such an embodiment, the computer program can be downloaded and installed from the network through the communication means 809, or installed from the storage means 808, or installed from the ROM 802. When the computer program is executed by the processing means 801, the above functions defined in the method of the embodiment of the present disclosure are performed.

It should be noted that the computer-readable medium mentioned above in the present disclosure can be a computer-readable signal medium or a computer-readable storage medium or any combination of the two. The computer-readable storage medium can be, for example, but not limited to, an electrical, magnetic, optical, electromagnetic, infrared, or semiconductor system, apparatus or device, or a combination of any of the above. More specific examples of the computer-readable storage medium can include, but are not limited to, an electrical connection with one or more wires, a portable computer disk, a hard disk, a Random Access Memory (RAM), a Read Only Memory (ROM), an Erasable Programmable Read Only Memory (EPROM or flash memory), an optical fiber, a portable Compact Disk Read Only Memory (CD-ROM), an optical storage device, a magnetic storage device, or any suitable combination of the above. In the present disclosure, the computer-readable storage medium can be any tangible medium containing or storing a program, which can be used by or in combination with an instruction execution system, apparatus or device. In the present disclosure, the computer-readable signal medium can include a data signal propagated in baseband or as part of a carrier wave, in which computer-readable program codes are carried. This propagated data signal can take many forms, including but not limited to an electromagnetic signal, an optical signal or any suitable combination of the above. The computer-readable signal medium can also be any computer-readable medium other than the computer-readable storage medium, which can send, propagate, or transmit a program for use by or in connection with an instruction execution system, apparatus or device. The program codes contained in the computer-readable medium can be transmitted by any suitable medium, including but not limited to: wires, optical cables, RF (radio frequency) and the like, or any suitable combination of the above.

In order to realize the above embodiment, an embodiment of the present disclosure also provides a computer-readable storage medium, in which computer-executed instructions are stored, and when executing the computer-executed instructions, the processor implements the image processing method according to any of the above embodiments.

In order to realize the above embodiment, an embodiment of the present disclosure also provides a computer program product, including a computer program, which, when executed by a processor, implements the image processing method according to any of the above embodiments.

The above computer-readable medium can be contained in the above electronic device; or it can exist alone without being assembled into the electronic device.

The above computer-readable medium carries one or more programs, which, when executed by an electronic device, cause the electronic device to perform the method shown in the above embodiments.

Computer program codes for performing the operations of the present disclosure can be written in one or more programming languages or combinations thereof, including object-oriented programming languages such as Java, Smalltalk, C++, and conventional procedural programming languages such as "C" or similar programming languages. The program codes can be completely executed on a user computer, partially executed on the user computer, executed as an independent software package, partially executed on the user computer and partially executed on a remote computer, or completely executed on the remote computer or a server. In the case of involving a remote computer, the remote computer can be connected to a user computer through any kind of network, including a Local Area Network (LAN) or a Wide Area Network (WAN), or can be connected to an external computer (for example, through the Internet by using an Internet service provider).

The flow diagrams and block diagrams in the drawings illustrate the architecture, functions and operations of possible implementations of the system, method and computer program product according to various embodiments of the present disclosure. In this regard, each block in the flow diagrams or block diagrams can represent a module, a program segment, or a part of code that contains one or more executable instructions for implementing specified logical functions. It should also be noted that in some alternative implementations, the functions noted in the blocks can occur in a different order than those noted in the drawings. For example, two blocks shown in succession can actually be executed substantially in parallel, and they can sometimes be executed in the reverse order, depending on the functions involved. It should also be noted that each or a combination of blocks in the block diagrams and/or flow diagrams can be implemented by a dedicated hardware-based system that performs specified functions or operations, or by a combination of dedicated hardware and computer instructions.

The involved units described in the embodiments of the present disclosure can be implemented by software or hardware. The name of the unit does not constitute the limitation of the unit itself in some cases. For example, the first acquisition unit can also be described as "a unit that acquires at least two Internet protocol addresses".

The functions described above herein can be at least partially performed by one or more hardware logic components. For example, without limitation, exemplary types of hardware logic components that can be used include: a Field Programmable Gate Array (FPGA), an Application Specific Integrated Circuit (ASIC), an Application Specific Standard Product (ASSP), a System on Chip (SOC), a Complex Programmable Logic Device (CPLD) and so on.

In the context of the present disclosure, a machine-readable medium can be a tangible medium that can contain or store a program for use by or in connection with an instruction execution system, apparatus or device. The machine-readable medium can be a machine-readable signal medium or a machine-readable storage medium. The machine-readable medium can include, but is not limited to, an electronic, magnetic, optical, electromagnetic, infrared, or semiconductor system, apparatus or device, or any suitable combination of the above. More specific examples of the machine-readable storage medium can include an electrical connection based on one or more lines, a portable computer disk, a hard disk, a Random Access Memory (RAM), a Read Only Memory (ROM), an Erasable Programmable Read Only Memory (EPROM or flash memory), an optical fiber, a convenient Compact Disk Read Only Memory (CD-ROM), an optical storage device, a magnetic storage device, or any suitable combination of the above.

In a first aspect, according to one or more embodiments of the present disclosure, there is provided an image processing method, including:

acquiring at least one target object area image in a target image frame corresponding to a virtual reality live streaming in response to a target object processing request triggered by a user in the virtual reality live streaming process;

performing a distortion correction operation on the at least one target object area image to obtain at least one distortion-free image;

performing an image processing operation based on the at least one distortion-free image to obtain at least one processed image;

performing an inverse transformation operation of the distortion correction operation on the at least one processed image to obtain at least one inversely transformed image;

replacing the at least one target object area image in the target image frame with the at least one inversely transformed image to obtain a processed target image frame.

According to one or more embodiments of the present disclosure, the acquiring at least one target object area image in a target image frame corresponding to a virtual reality live streaming in response to a target object processing request triggered by a user in the virtual reality live streaming process includes:

acquiring a live video stream corresponding to the virtual reality live streaming in response to the target object processing request triggered by the user in the virtual reality live streaming process;

for each target image frame in the live video stream, performing a target object recognition operation on the target image frame to determine position information of at least one target object in the target image frame;

acquiring the at least one target object area image according to the position information of the at least one target object.

According to one or more embodiments of the present disclosure, the performing a target object recognition operation on the target image frame to determine position information of at least one target object in the target image frame includes:

performing a scaling operation on the target image frame according to a preset scale size to obtain a scaled target image frame;

performing a target object recognition operation on the scaled target image frame to determine the position information of the at least one target object in the scaled target image frame.

According to one or more embodiments of the present disclosure, the performing a distortion correction operation on the at least one target object area image to obtain at least one distortion-free image includes:

establishing a virtual camera located at the origin of the world coordinate system;

for each target object area image, converting the target object area image into an image from the perspective of the virtual camera to obtain the distortion-free image.

According to one or more embodiments of the present disclosure, for each target object area image, the converting the target object area image into an image from the perspective of the virtual camera to obtain the distortion-free image includes:

for each first pixel point in each target object area image from the perspective of the virtual camera, performing a matrix projection operation on the first pixel point according to an observation matrix and a projection matrix corresponding to the virtual camera to obtain a first three-dimensional space coordinate;

determining first latitude and longitude information of each first pixel point in a spherical coordinate system where the target object area image is located according to the first three-dimensional space coordinate corresponding to each first pixel point;

determining a first texture mapping coordinate corresponding to the first latitude and longitude information according to a mapping relationship between the latitude and longitude and a texture mapping coordinate system corresponding to the target object area image;

performing a combination operation on the first texture mapping coordinate corresponding to each first pixel point to obtain the distortion-free image.

According to one or more embodiments of the present disclosure, the performing an image processing operation based on the at least one distortion-free image to obtain at least one processed image includes:

performing a target object key point recognition operation on at least one distortion-free image to obtain target object key point information corresponding to the at least one distortion-free image;

performing an image processing operation on a target object in the at least one distortion-free image according to the target object key point information corresponding to the at least one distortion-free image to obtain the at least one processed image.

According to one or more embodiments of the present disclosure, the performing an inverse transformation operation of the distortion correction operation on the at least one processed image to obtain at least one inversely transformed image includes:

for each second pixel point in each target object area image, determining that a second texture mapping coordinate corresponding to the second pixel point is converted into second latitude and longitude information according to a mapping relationship between a texture mapping coordinate system corresponding to the target object area image and the latitude and longitude;

determining a second three-dimensional space coordinate corresponding to the second pixel point according to the second latitude and longitude information;

detecting whether the second three-dimensional space coordinate is in a visible range of the virtual camera located at the origin of the world coordinate system;

processing the second three-dimensional space coordinate according to a detection result to obtain the inversely transformed image.

According to one or more embodiments of the present disclosure, the processing the second three-dimensional space coordinate according to a detection result to obtain the inversely transformed image includes:

if the second three-dimensional space coordinate is in the visible range of the virtual camera, performing a matrix projection operation on the second three-dimensional space coordinate according to an observation matrix and a projection matrix corresponding to an image acquisition apparatus that acquires the target object area image to obtain a third pixel point of the second three-dimensional space coordinate from the perspective of the image acquisition apparatus, and replacing the corresponding second pixel point with the third pixel point;

if the second three-dimensional space coordinate is not in the visible range of the virtual camera, not processing the second pixel point corresponding to the second three-dimensional space coordinate;

generating the inversely transformed image according to the third pixel point located in the visible range of the virtual camera and the second pixel point not in the visible range of the virtual camera.

According to one or more embodiments of the present disclosure, the replacing the at least one target object area image in the target image frame with the at least one inversely transformed image to obtain a processed target image frame includes:

for each target object area image, determining a display position of the target object area image in the target image frame;

replacing the target object area image with the inversely transformed image according to the display position to obtain the processed target image frame.

In a second aspect, according to one or more embodiments of the present disclosure, there is provided an image processing apparatus including:

an acquisition module for acquiring at least one target object area image in a target image frame corresponding to a virtual reality live streaming in response to a target object processing request triggered by a user in the virtual reality live streaming process;

a correction module for performing a distortion correction operation on the at least one target object area image to obtain at least one distortion-free image;

a processing module for performing an image processing operation based on the at least one distortion-free image to obtain at least one processed image;

an inverse transformation module for performing an inverse transformation operation of the distortion correction operation on the at least one processed image to obtain at least one inversely transformed image;

a replacement module for replacing the at least one target object area image in the target image frame with the at least one inversely transformed image to obtain a processed target image frame.

According to one or more embodiments of the present disclosure, the acquisition module is used for:

acquiring a live video stream corresponding to the virtual reality live streaming in response to the target object processing request triggered by the user in the virtual reality live streaming process;

for each target image frame in the live video stream, performing a target object recognition operation on the target image frame to determine position information of at least one target object in the target image frame;

acquiring the at least one target object area image according to the position information of the at least one target object.

According to one or more embodiments of the present disclosure, the acquisition module is used for:

performing a scaling operation on the target image frame according to a preset scale size to obtain a scaled target image frame;

performing a target object recognition operation on the scaled target image frame to determine the position information of the at least one target object in the scaled target image frame.

According to one or more embodiments of the present disclosure, the correction module is used for:

establishing a virtual camera located at the origin of the world coordinate system;

for each target object area image, converting the target object area image into an image from the perspective of the virtual camera to obtain the distortion-free image.

According to one or more embodiments of the present disclosure, the correction module is used for:

for each first pixel point in each target object area image from the perspective of the virtual camera, performing a matrix projection operation on the first pixel point according to an observation matrix and a projection matrix corresponding to the virtual camera to obtain a first three-dimensional space coordinate;

determining first latitude and longitude information of each first pixel point in a spherical coordinate system where the target object area image is located according to the first three-dimensional space coordinate corresponding to each first pixel point;

determining a first texture mapping coordinate corresponding to the first latitude and longitude information according to a mapping relationship between the latitude and longitude and a texture mapping coordinate system corresponding to the target object area image;

performing a combination operation on the first texture mapping coordinate corresponding to each first pixel point to obtain the distortion-free image.

According to one or more embodiments of the present disclosure, the processing module is used for:

performing a target object key point recognition operation on the at least one distortion-free image to obtain target object key point information corresponding to the at least one distortion-free image;

performing an image processing operation on a target object in the at least one distortion-free image according to the target object key point information corresponding to the at least one distortion-free image to obtain the at least one processed image.

According to one or more embodiments of the present disclosure, the inverse transformation module is used for:

for each second pixel point in each target object area image, determining that a second texture mapping coordinate corresponding to the second pixel point is converted into second latitude and longitude information according to a mapping relationship between a texture mapping coordinate system corresponding to the target object area image and the latitude and longitude;

determining a second three-dimensional space coordinate corresponding to the second pixel point according to the second latitude and longitude information;

detecting whether the second three-dimensional space coordinate is in a visible range of the virtual camera located at the origin of the world coordinate system;

processing the second three-dimensional space coordinate according to a detection result to obtain the inversely transformed image.

According to one or more embodiments of the present disclosure, the inverse transformation module is used for:

if the second three-dimensional space coordinate is in the visible range of the virtual camera, performing a matrix projection operation on the second three-dimensional space coordinate according to an observation matrix and a projection matrix corresponding to an image acquisition apparatus that acquires the target object area image to obtain a third pixel point of the second three-dimensional space coordinate from the perspective of the image acquisition apparatus, and replacing the corresponding second pixel point with the third pixel point;

if the second three-dimensional space coordinate is not in the visible range of the virtual camera, not processing the second pixel point corresponding to the second three-dimensional space coordinate;

generating the inversely transformed image according to the third pixel point located in the visible range of the virtual camera and the second pixel point not in the visible range of the virtual camera.

According to one or more embodiments of the present disclosure, the replacement module is used for:

for each target object area image, determining a display position of the target object area image in the target image frame;

replacing the target object area image with the inversely transformed image according to the display position to obtain the processed target image frame.

In a third aspect, according to one or more embodiments of the present disclosure, there is provided an electronic device, including: at least one processor and a memory;

wherein the memory stores computer-executed instructions;

the at least one processor executes the computer-executed instructions stored in the memory, so that the at least one processor executes the image processing method according to the above first aspect and various possible designs of the first aspect.

In a fourth aspect, according to one or more embodiments of the present disclosure, there is provided a computer-readable storage medium, wherein the computer-readable storage medium stores therein computer-executed instructions, which when executed by a processor, implements the image processing method according to the above first aspect and various possible designs of the first aspect.

In a fifth aspect, according to one or more embodiments of the present disclosure, there is provided a computer program product, including a computer program, wherein the computer program, when executed by a processor, implements the image processing method according to the above first aspect and various possible designs of the first aspect.

The above description is only the preferred embodiments of the present disclosure and the explanation of the applied technical principles. It should be understood by those skilled in the art that the disclosure scope involved in the present disclosure is not limited to the technical solution formed by the specific combination of the above technical features, but also covers other technical solutions formed by any combination of the above technical features or their equivalent features without departing from the above disclosure concept, for example, the technical solution formed by mutual replacement of the above features with the technical features with similar functions disclosed in the present disclosure (but not limited to).

Furthermore, although the operations are depicted in a particular order, this should not be understood as requiring that these operations be performed in the particular order shown or in a sequential order. Under certain circumstances, multitasking and parallel processing may be beneficial. Likewise, although several specific implementation details are contained in the above discussion, these should not be construed as limiting the scope of the present disclosure. Some features described in the context of individual embodiments can also be combined in a single embodiment. On the contrary, various features described in the context of a single embodiment can also be implemented in a plurality of embodiments individually or in any suitable sub-combination.

Although the subject matter has been described in language specific to structural features and/or methodological logical actions, it should be understood that the subject matter defined in the appended Claims is not necessarily limited to the specific features or actions described above. On the contrary, the specific features and actions described above are only exemplary forms of implementing the Claims.

What is claimed is:

1. An image processing method, comprising:

acquiring at least one target object area image in a target image frame corresponding to virtual reality live streaming in response to a target object processing request triggered by a user in the virtual reality live streaming process;

performing a distortion correction operation on the at least one target object area image to obtain at least one distortion-free image;

performing an image processing operation based on the at least one distortion-free image to obtain at least one processed image;

performing an inverse transformation operation of the distortion correction operation on the at least one processed image to obtain at least one inversely transformed image; and replacing the at least one target object area image in the target image frame with the at least one inversely transformed image to obtain a processed target image frame.

2. The method according to claim 1, wherein the acquiring at least one target object area image in a target image frame corresponding to the virtual reality live streaming in response to a target object processing request triggered by a user in the virtual reality live streaming process comprises:

acquiring a live video stream corresponding to the virtual reality live streaming in response to the target object processing request triggered by the user in the virtual reality live streaming process;

for each target image frame in the live video stream, performing a target object recognition operation on the target image frame to determine position information of at least one target object in the target image frame;

acquiring the at least one target object area image according to the position information of the at least one target object.

3. The method according to claim 2, wherein the performing a target object recognition operation on the target image frame to determine position information of at least one target object in the target image frame comprises:

performing a scaling operation on the target image frame according to a preset scale size to obtain a scaled target image frame;

performing a target object recognition operation on the scaled target image frame to determine the position information of the at least one target object in the scaled target image frame.

4. The method according to claim 1, wherein the performing a distortion correction operation on the at least one target object area image to obtain at least one distortion-free image comprises:

establishing a virtual camera located at an origin of a world coordinate system; for each target object area image, converting the target object area image into an image from the perspective of the virtual camera to obtain the distortion-free image.

5. The method according to claim 4, wherein, for each target object area image, the converting the target object area image into an image from the perspective of the virtual camera to obtain the distortion-free image comprises:

for each first pixel point in each target object area image from the perspective of the virtual camera, performing a matrix projection operation on the first pixel point according to an observation matrix and a projection matrix corresponding to the virtual camera to obtain a first three-dimensional space coordinate;

determining first latitude and longitude information of each first pixel point in a spherical coordinate system where the target object area image is located according to the first three-dimensional space coordinate corresponding to each first pixel point;

determining a first texture mapping coordinate corresponding to the first latitude and longitude information according to a mapping relationship between the latitude and longitude and a texture mapping coordinate system corresponding to the target object area image;

performing a combination operation on the first texture mapping coordinate corresponding to each first pixel point to obtain the distortion-free image.

6. The method according to claim 1, wherein the performing an image processing operation based on the at least one distortion-free image to obtain at least one processed image comprises:

performing a target object key point recognition operation on the at least one distortion-free image to obtain target object key point information corresponding to the at least one distortion-free image;

performing an image processing operation on a target object in the at least one distortion-free image according to the target object key point information corresponding to the at least one distortion-free image to obtain the at least one processed image.

7. The method according to claim 1, wherein the performing an inverse transformation operation of the distortion correction operation on the at least one processed image to obtain at least one inversely transformed image comprises:

for each second pixel point in each target object area image, determining that a second texture mapping coordinate corresponding to the second pixel point is converted into second latitude and longitude information according to a mapping relationship between a texture mapping coordinate system corresponding to the target object area image and the latitude and longitude;

determining a second three-dimensional space coordinate corresponding to the second pixel point according to the second latitude and longitude information;

detecting whether the second three-dimensional space coordinate is in a visible range of the virtual camera located at the origin of the world coordinate system;

processing the second three-dimensional space coordinate according to a detection result to obtain the inversely transformed image.

8. The method according to claim 7, wherein the processing the second three-dimensional space coordinate according to a detection result to obtain the inversely transformed image comprises:

if the second three-dimensional space coordinate is in the visible range of the virtual camera, performing a matrix projection operation on the second three-dimensional space coordinate according to an observation matrix and a projection matrix corresponding to an image acquisition apparatus that acquires the target object area image to obtain a third pixel point of the second three-dimensional space coordinate from the perspective of the image acquisition apparatus, and replacing the corresponding second pixel point with the third pixel point;

if the second three-dimensional space coordinate is not in the visible range of the virtual camera, not processing the second pixel point corresponding to the second three-dimensional space coordinate;

generating the inversely transformed image according to the third pixel point located in the visible range of the virtual camera and the second pixel point not in the visible range of the virtual camera.

9. The method according to claim 1, wherein the replacing the at least one target object area image in the target image frame with the at least one inversely transformed image to obtain a processed target image frame comprises:

for each target object area image, determining a display position of the target object area image in the target image frame;

replacing the target object area image with the inversely transformed image according to the display position to obtain the processed target image frame.

10. An electronic device, comprising: a processor and a memory;

wherein the memory stores computer-executable instructions;

the processor executes the computer-executable instructions stored in the memory, so that the processor executes an image processing method, comprising:

acquiring at least one target object area image in a target image frame corresponding to virtual reality live streaming in response to a target object processing request triggered by a user in the virtual reality live streaming process;

performing a distortion correction operation on the at least one target object area image to obtain at least one distortion-free image;

performing an image processing operation based on the at least one distortion-free image to obtain at least one processed image;

performing an inverse transformation operation of the distortion correction operation on the at least one processed image to obtain at least one inversely transformed image; and replacing the at least one target object area image in the target image frame with the at least one inversely transformed image to obtain a processed target image frame.

11. A non-transitory computer-readable storage medium, wherein the computer-readable storage medium stores therein computer-executable instructions, which when executed by a processor, implements an image processing comprising:

acquiring at least one target object area image in a target image frame corresponding to virtual reality live streaming in response to a target object processing request triggered by a user in the virtual reality live streaming process;

performing a distortion correction operation on the at least one target object area image to obtain at least one distortion-free image;

performing an image processing operation based on the at least one distortion-free image to obtain at least one processed image;

performing an inverse transformation operation of the distortion correction operation on the at least one processed image to obtain at least one inversely transformed image; and replacing the at least one target object area image in the target image frame with the at least one inversely transformed image to obtain a processed target image frame.

12. The electronic device according to claim 10, wherein the acquiring at least one target object area image in a target image frame corresponding to the virtual reality live streaming in response to a target object processing request triggered by a user in the virtual reality live streaming process comprises:

acquiring a live video stream corresponding to the virtual reality live streaming in response to the target object processing request triggered by the user in the virtual reality live streaming process;

for each target image frame in the live video stream, performing a target object recognition operation on the target image frame to determine position information of at least one target object in the target image frame;

acquiring the at least one target object area image according to the position information of the at least one target object.

13. The electronic device according to claim 12, wherein the performing a target object recognition operation on the target image frame to determine position information of at least one target object in the target image frame comprises:

performing a scaling operation on the target image frame according to a preset scale size to obtain a scaled target image frame;

performing a target object recognition operation on the scaled target image frame to determine the position information of the at least one target object in the scaled target image frame.

14. The electronic device according to claim 10, wherein the performing a distortion correction operation on the at least one target object area image to obtain at least one distortion-free image comprises:

establishing a virtual camera located at an origin of a world coordinate system;

for each target object area image, converting the target object area image into an image from the perspective of the virtual camera to obtain the distortion-free image.

15. The electronic device according to claim 14, wherein, for each target object area image, the converting the target object area image into an image from the perspective of the virtual camera to obtain the distortion-free image comprises:

for each first pixel point in each target object area image from the perspective of the virtual camera, performing a matrix projection operation on the first pixel point according to an observation matrix and a projection matrix corresponding to the virtual camera to obtain a first three-dimensional space coordinate;

determining first latitude and longitude information of each first pixel point in a spherical coordinate system where the target object area image is located according to the first three-dimensional space coordinate corresponding to each first pixel point;

determining a first texture mapping coordinate corresponding to the first latitude and longitude information according to a mapping relationship between the latitude and longitude and a texture mapping coordinate system corresponding to the target object area image;

performing a combination operation on the first texture mapping coordinate corresponding to each first pixel point to obtain the distortion-free image.

16. The electronic device according to claim 10, wherein the performing an image processing operation based on the at least one distortion-free image to obtain at least one processed image comprises:

performing a target object key point recognition operation on the at least one distortion-free image to obtain target object key point information corresponding to the at least one distortion-free image;

performing an image processing operation on a target object in the at least one distortion-free image according to the target object key point information corresponding to the at least one distortion-free image to obtain the at least one processed image.

17. The non-transitory computer-readable storage medium according to claim 11, wherein the acquiring at least one target object area image in a target image frame corresponding to the virtual reality live streaming in response to a target object processing request triggered by a user in the virtual reality live streaming process comprises:

acquiring a live video stream corresponding to the virtual reality live streaming in response to the target object processing request triggered by the user in the virtual reality live streaming process;

for each target image frame in the live video stream, performing a target object recognition operation on the target image frame to determine position information of at least one target object in the target image frame;

acquiring the at least one target object area image according to the position information of the at least one target object.

18. The non-transitory computer-readable storage medium according to claim 17, wherein the performing a target object recognition operation on the target image frame to determine position information of at least one target object in the target image frame comprises:

performing a scaling operation on the target image frame according to a preset scale size to obtain a scaled target image frame;

performing a target object recognition operation on the scaled target image frame to determine the position information of the at least one target object in the scaled target image frame.

19. The non-transitory computer-readable storage medium according to claim 11, wherein the performing a distortion correction operation on the at least one target object area image to obtain at least one distortion-free image comprises:

establishing a virtual camera located at an origin of a world coordinate system;

for each target object area image, converting the target object area image into an image from the perspective of the virtual camera to obtain the distortion-free image.

20. The non-transitory computer-readable storage medium according to claim 19, wherein, for each target object area image, the converting the target object area image into an image from the perspective of the virtual camera to obtain the distortion-free image comprises:

for each first pixel point in each target object area image from the perspective of the virtual camera, performing a matrix projection operation on the first pixel point according to an observation matrix and a projection matrix corresponding to the virtual camera to obtain a first three-dimensional space coordinate;

determining first latitude and longitude information of each first pixel point in a spherical coordinate system where the target object area image is located according to the first three-dimensional space coordinate corresponding to each first pixel point;

determining a first texture mapping coordinate corresponding to the first latitude and longitude information according to a mapping relationship between the latitude and longitude and a texture mapping coordinate system corresponding to the target object area image;

performing a combination operation on the first texture mapping coordinate corresponding to each first pixel point to obtain the distortion-free image.

* * * * *